United States Patent [19]

Mathieu et al.

[11] Patent Number: 5,163,100
[45] Date of Patent: Nov. 10, 1992

[54] IMAGE PROCESSING CIRCUIT WITH REDUCED NUMBER OF CONTACT PADS

[75] Inventors: Yves Mathieu, Boulogne; Philippe Martin, Fresnes, both of France

[73] Assignee: U.S. Philips Corporation, New York, N.Y.

[21] Appl. No.: 681,629

[22] Filed: Apr. 2, 1991

Related U.S. Application Data

[63] Continuation of Ser. No. 376,059, Jul. 5, 1989, abandoned.

[30] Foreign Application Priority Data

Jul. 8, 1988 [FR] France .................. 88 09293

[51] Int. Cl.⁵ .................. G06K 9/56; G06K 9/36; G06F 15/31; G06F 15/336
[52] U.S. Cl. .................. 382/27; 382/41; 382/49; 364/724.12; 364/728.01; 358/37; 358/166
[58] Field of Search .................. 382/42, 41, 27, 49; 364/514, 724.12, 728.01; 358/166, 37

[56] References Cited

U.S. PATENT DOCUMENTS

| | | | |
|---|---|---|---|
| 4,363,104 | 12/1982 | Nussmeier | 382/41 |
| 4,380,046 | 4/1983 | Fung | 364/200 |
| 4,550,437 | 10/1985 | Kobayashi et al. | 382/41 |
| 4,791,677 | 12/1988 | Mori et al. | 382/42 |
| 4,833,635 | 5/1989 | McCanny et al. | 364/728.01 |
| 4,864,629 | 9/1989 | Deering | 382/42 |
| 4,939,575 | 7/1990 | Childers | 382/41 |

FOREIGN PATENT DOCUMENTS 0189943 6/1986 European Pat. Off. .

OTHER PUBLICATIONS

T. Fukushima, "Image Signal Processor Computes Fast Enough for Gray-Scale Video" Electronic Design, vol. 32, Oct. 4, 1984, pp. 209-215.
R. Gnanasekaran, "On a Bit-Serial Input and Bit-Serial Output Multiplier", IEEE Transaction on Computers, vol. C-32, No. 9, Sep. 1983, pp. 878-880.

Primary Examiner—David K. Moore
Assistant Examiner—Michael Cammarata
Attorney, Agent, or Firm—Jack E. Haken

[57] ABSTRACT

An integrated circuit for the processing of digitized signals which are representative of a source image which is defined by image elements which are encoded on M bits and which are arranged in I rows and J columns. The image is processed by means of M sliding windows ($W_1$ to $W_M$) which consist of N rows and P columns and which step-wise slide past each image element along I rows, but which have been shifted through one row with respect to one another. Processing is performed by bit serial operators which successively act on the bits of each of the $N+N-1$ image elements. The signals may be serially applied via Q contact pads, where $Q=N+M-1$, or in parallel via Q contact pads where Q is the first multiple of M which is equal to or larger than $N+M-1$, the integrated circuit then also comprising a parallel to serial converter circuit.

2 Claims, 5 Drawing Sheets

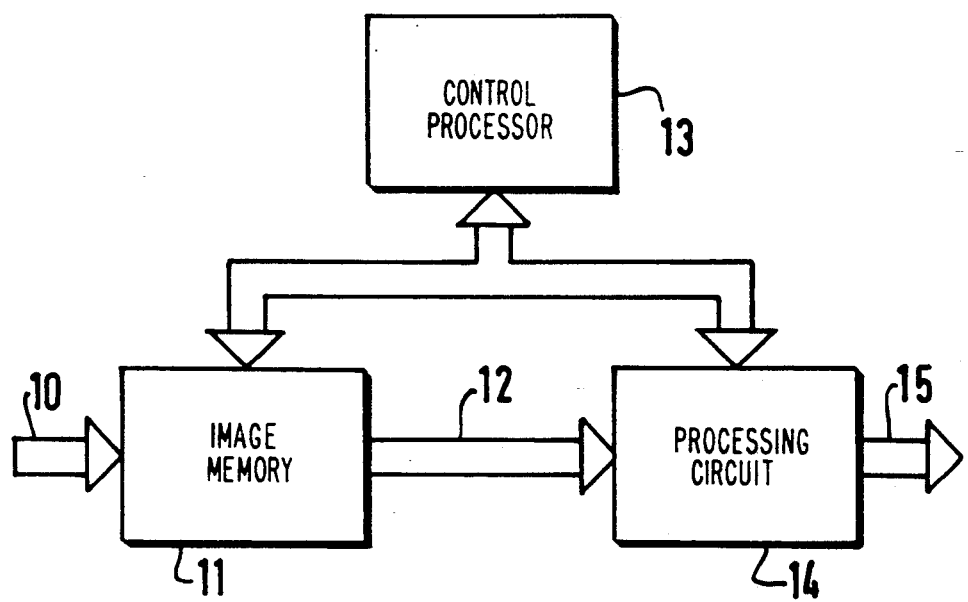
FIG.1
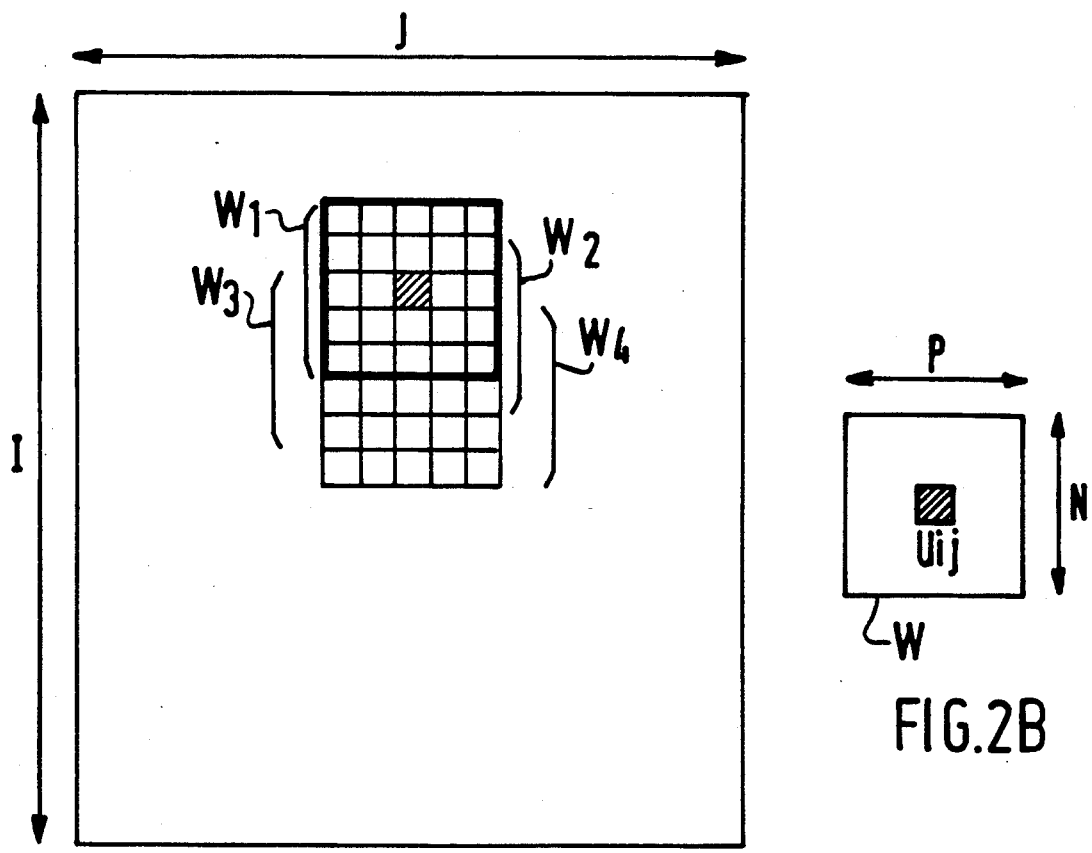
FIG.2A
FIG.2B

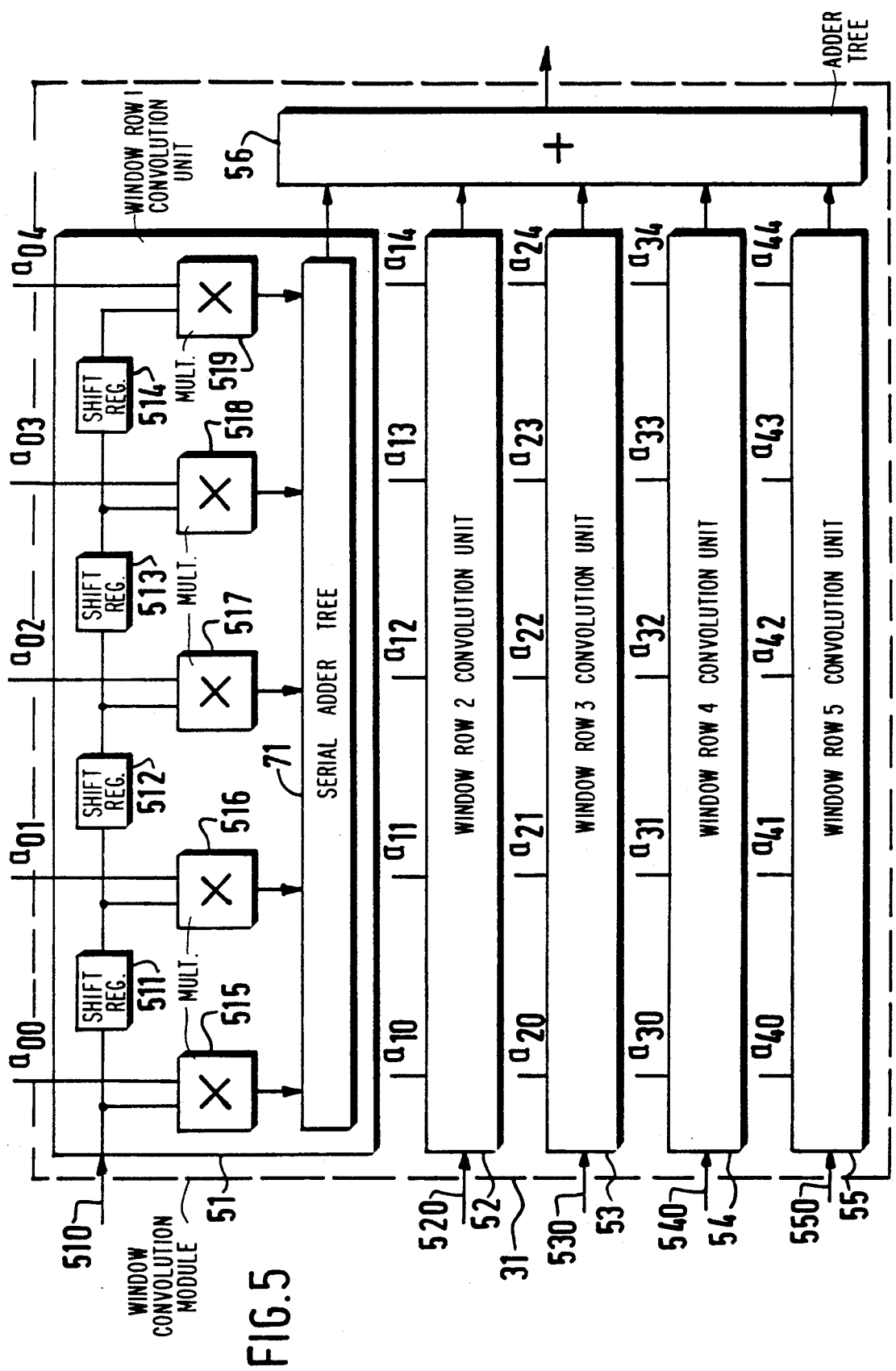

IMAGE PROCESSING CIRCUIT WITH REDUCED NUMBER OF CONTACT PADS

This is a continuation of application Ser. No. 376,059, filed Jul. 5, 1989 now abandoned.

BACKGROUND OF THE INVENTION

The invention relates to an integrated circuit for the processing of digitised signals which are representative of a source image which is defined by image elements which are encoded on M bits and which are arranged in I rows and J columns, the processing of said source image being performed by step-wise fetching local images which are defined by a window N.P consisting of N rows (wherein N>1) and P columns and sliding step-wise past each image element along the I rows of the source image. The invention also relates to an image processing device for covering any such configuration for which no window extends outside the source image.

An invention of this kind is known from U.S. Pat. No. 4,550,437 which discloses an apparatus for the parallel processing of local image data. The object is to conceive a large scale integrated circuit performing convolution type image processing procedures for various purposes (e.g. elimination of noise, detection of contours, . . . ). Difficulties encountered concern the high integration density and the large number of connection pads required for the integrated circuit. The processing consists of defining a local image which is taken from the overall image by means of a window and which comprises m rows of n elements. The described integrated circuit comprises 4 arrays of 4 elements which are processed by 4 memories and 4 processors for the processing of a 4×4 window. The bits of an image element are introduced in parallel into the first stage, are processed and subsequently shifted to the next processor and so on until all results are added in order to supply the desired result. However, when the width of the window is very large, the realisation of an integrated circuit where the bits are introduced in parallel quickly becomes impossible to realise because of the number of connections to the environment. Moreover, nothing is indicated as regards the realisation of the delay circuits, notably not as regards their integration.

SUMMARY OF THE INVENTION

For parallel processing by means of sliding windows a window W(i) is assumed which is horizontally displaced in the image to be processed and it also is assumed that a processing structure is available which enables calculation of the desired function for each cycle f(W(I)). For each cycle, the window is shifted one position to the right, necessitating the introduction of N data values for N elements into the processing structure. For example, in the case of a 9×9 window and encoding of the data of 8 bits, 72 new data bits must be introduced and 9 line delays must be used for accessing 9 consecutive lines. This least to circuits which comprise a large number of input connections.

The problem to be solved by the invention is the realisation of integrated circuits for digital data processing on the basis of a sliding window minimizing the number of connections to the environment. In a first version the solution to this problem consists in that the processing is performed simultaneously on S local images defined by S sliding windows which all have the same dimensions but which have been shifted through d rows of the source image with respect to one another, wherein $0<d<N$, and when the S sliding windows attain the end of their respective rows they collectively move to restart the same processing. This processing operation is performed by serial operators which successively act on each bit of each of the $N+(S-1)d$ image elements whose digitised signals are serially applied to the integrated circuit by means of Q contact pads, wherein Q is equal to the total number of rows that are processed coincidentally by the S local images, each of said Q contact pads receiving the digitised signals originating from a given image element.

Preferably, the number S of sliding windows is equal to the number of bits contained in each pixel (S=M) and the relative shift between successive windows is one line. In particular, this latter configuration will be described as a preferred embodiment. The values of M and d can be chosen independently. When the shift d is larger than one line, the totality of information necessary for processing must still be available, for example in that an interlacing organization is provided.

The integrated circuit performs a processing operation of the serial pipeline type utilising 1-bit processors. The surface area required by the integrated circuit is thus divided approximately by a number M which is equal to the width in bits of the words of the processed data, but the calculation speed is also divided in the embodiment, by M. In order to preserve a processing speed which is compatible with real time processing, M windows are processed in parallel. The surface area of such an integrated circuit is approximately equal to that of the parallel processor, but the number of connection wires is different. Actually, for a processing device for a window comprising N lines, it requires N input signals of M bits. Using M processors operating on N windows which have been shifted one line with respect to one another, the use of N+M-1 input lines suffices. Each processor shares N-1 lines with the preceding processor. The saving will thus be significant even for values of M and N which are not very high. Thus, for a 9×9 window (N=9) and 8-bit words (M=8), a parallel processor necessitates the use of 72 contact pads and the serial processor in accordance with the invention necessitates only 16.

However, the invention is not restricted to the case where data is serially applied to the contact pads. Actually, the parallel introduction of data can be maintained, via a reduced number of contact pads, when an internal parallel-series conversion is performed in order to enable the same operation of the serial operators as before.

Therefore, in accordance with a second version the processing is performed simultaneously on S local images which are defined by S sliding windows which all have the same dimensions but which have been shifted through d rows of the source image with respect to each other, wherein $0<d<N$, and when the S sliding windows have attained the ends of their respective rows, they move collectively to restart the same processing, which processing operation is performed by serial operators which successively act on each bit of each of the $N+(S-1)d$ image elements whose digitised signals are applied in parallel to the integrated circuit via Q contact pads, where Q is the first multiple of M which is equal to or larger than $N+(S-1)d$, the integrated circuit also comprising a parallel-series converter circuit. Just as in the earlier embodiment considered, preferably S=M and D=one row.

The serial operators can perform various operations on the digital data for which the processing consists of the simultaneous use of the local data defined by a window. It may concern an image processing operation, for example, filtering operations (convolution), sorting operations, or determination of maximum/minimum values in a given batch of data, or other operations.

BRIEF DESCRIPTION OF THE DRAWING

The invention will be described in detail hereinafter with reference to the accompanying diagrammatic drawings; therein:

FIG. 1 shows a general diagram of a processing system utilising an integrated processing circuit in accordance with the invention, FIGS. 2A, 2B show several windows superposed on an image;

FIG. 5 shows a diagram of a first embodiment for performing convolution operations.

DETAILED DESCRIPTION OF THE PREFERRED EMBODIMENT

Figure 3:
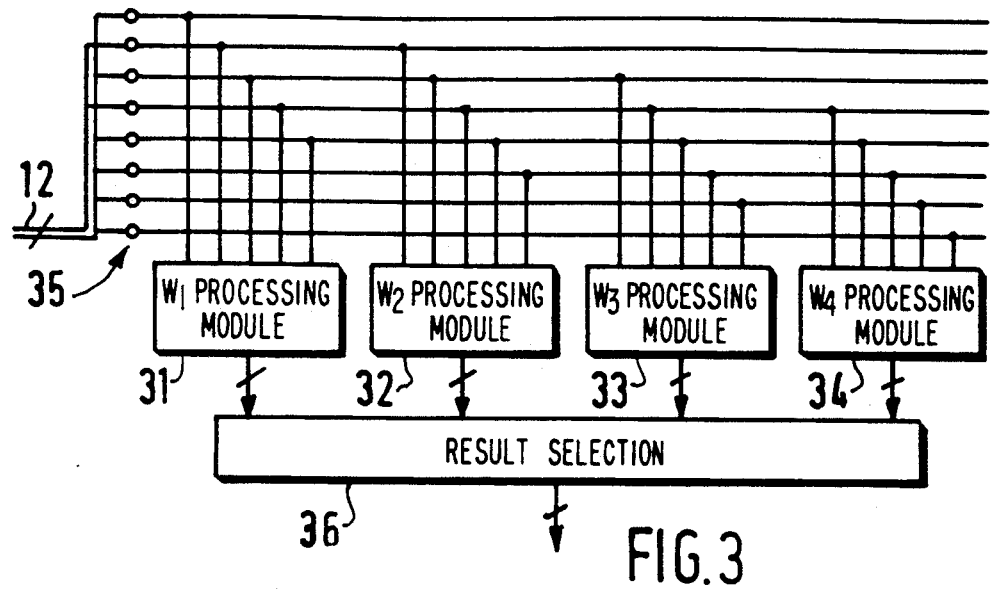
FIG. 3 shows a diagram relating to a processing example utilising 4 modules operation on 5-line windows.

FIG. 1 shows a processing device which comprises an image memory 11 which receives the data from the bus 10 either from a camera or from any device having already processed the images (not shown). A control processor 13 generates the addresses for reading the memory 11 and for each point from the memory 11 an integrated processing circuit 14 generates a result which is a function of the environment of this point. This result is output on the bus 15 for further use.

The image memory (FIG. 2A) is a matrix of I.J points, each of which is characterized by a data value denoted as $d_{ij}$ at the point or image element $V_{ij}$, where i represents the row and j represents the column. These values are encoded on M bits (typically M=8), the value of the bit m of the point $V_{ij}$ being denoted as $d_{ij}^m$. The processing device operates on a rectangular window which is centred at $V_{ij}$ and which comprises N rows and P columns (FIG. 2B). The value calculated in accordance with an image processing procedure will be $g_{ij}=f(d_{i+n,j+p})$, where n is situated between $-N/2$ and $N/2$ and p is situated between $-P/2$ and $P/2$.

By way of example, FIG. 2A shows a 5×5 window (N=P=5). In accordance with the invention, when a data value is encoded on M bits (for example, M=4), the entering of the bits of the data value in the serial mode will reduce the processing speed by a factor equal to M=4. In order to maintain the same processing speed, in accordance with the invention use is made of 4 windows: W1, W2, W3 and W4 each 5×5 but successively offset one row so that 8 image rows are viewed by the combination of the 4 windows. In the integrated circuit each column of a window will be processed by a window column processing module 31, 32, 33, 34, respectively (FIG. 3). The data bus 12 comprises a number of contact pads 35 equal to $N+M-1=8$ in the present example. The bus simultaneously receives the 8 data bits from 8 image elements lying in a column when the bits of the data values are serially input, and 8 data bits from 2 image elements lying in a column when the bits of the data values are applied in parallel. In the serial mode the module 31 receives the data values from the first to the fifth row.

The module 32 receives the data values from the second to the sixth row.

The module 33 receives the data values from the third to the seventh row.

The module 34 receives the data values from the fourth to the eighth row.

The results of the 4 modules are selected by the block 36 in order to supply the processing results. The bits of each data value having been input serially, it is necessary to ensure that at the start all data bits are input before the first result is obtained, but after that the data stream is constant. When the processing of the image source by the 4 modules is completed for the current window positions, the windows are shifted in position 4 rows, for example, the window W1 then extends from the fifth row to the eights row and so on for the other shifted windows.

The bit-serial data stream such as they appear on the contact pads are represented in table 1 for the serial mode.

TABLE 1

| Pads | $T_1$ | $T_2$ | $T_3$ | $T_4$ | $T_5$ | $T_6$ |
|---|---|---|---|---|---|---|
| 1 | $d_{11}^1$ | $d_{11}^2$ | $d_{11}^3$ | $d_{11}^4$ | $d_{12}^1$ | $d_{12}^2$ |
| 2 | $d_{21}^1$ | $d_{21}^2$ | $d_{21}^3$ | $d_{21}^4$ | $d_{22}^1$ | $d_{22}^2$ |
| 3 | $d_{31}^1$ | $d_{31}^2$ | $d_{31}^3$ | $d_{31}^4$ | $d_{32}^1$ | $d_{32}^2$ |
| 4 | $d_{41}^1$ | $d_{41}^2$ | $d_{41}^3$ | $d_{41}^4$ | $d_{42}^1$ | $d_{42}^2$ |
| 5 | $d_{51}^1$ | $d_{51}^2$ | $d_{51}^3$ | $d_{51}^4$ | $d_{52}^1$ | $d_{52}^2$ |
| 6 | $d_{61}^1$ | $d_{61}^2$ | $d_{61}^3$ | $d_{61}^4$ | $d_{62}^1$ | $d_{62}^2$ |
| 7 | $d_{71}^1$ | $d_{71}^2$ | $d_{71}^3$ | $d_{71}^4$ | $d_{72}^1$ | $d_{72}^2$ |
| 8 | $d_{81}^1$ | $d_{81}^2$ | $d_{81}^3$ | $d_{81}^4$ | $d_{82}^1$ | $d_{82}^2$ |

It appears, for example that on the pad 1 the 4 data bits for the data value $d_{11}$ arrive during the periods $T_1$, $T_2$, $T_3$ and $T_4$. The processing is executed for all windows that do not extend outside the source image. At the edges, the processing is either suspended, or the image is extended by necessary dummy pixels.

Figure 4A:
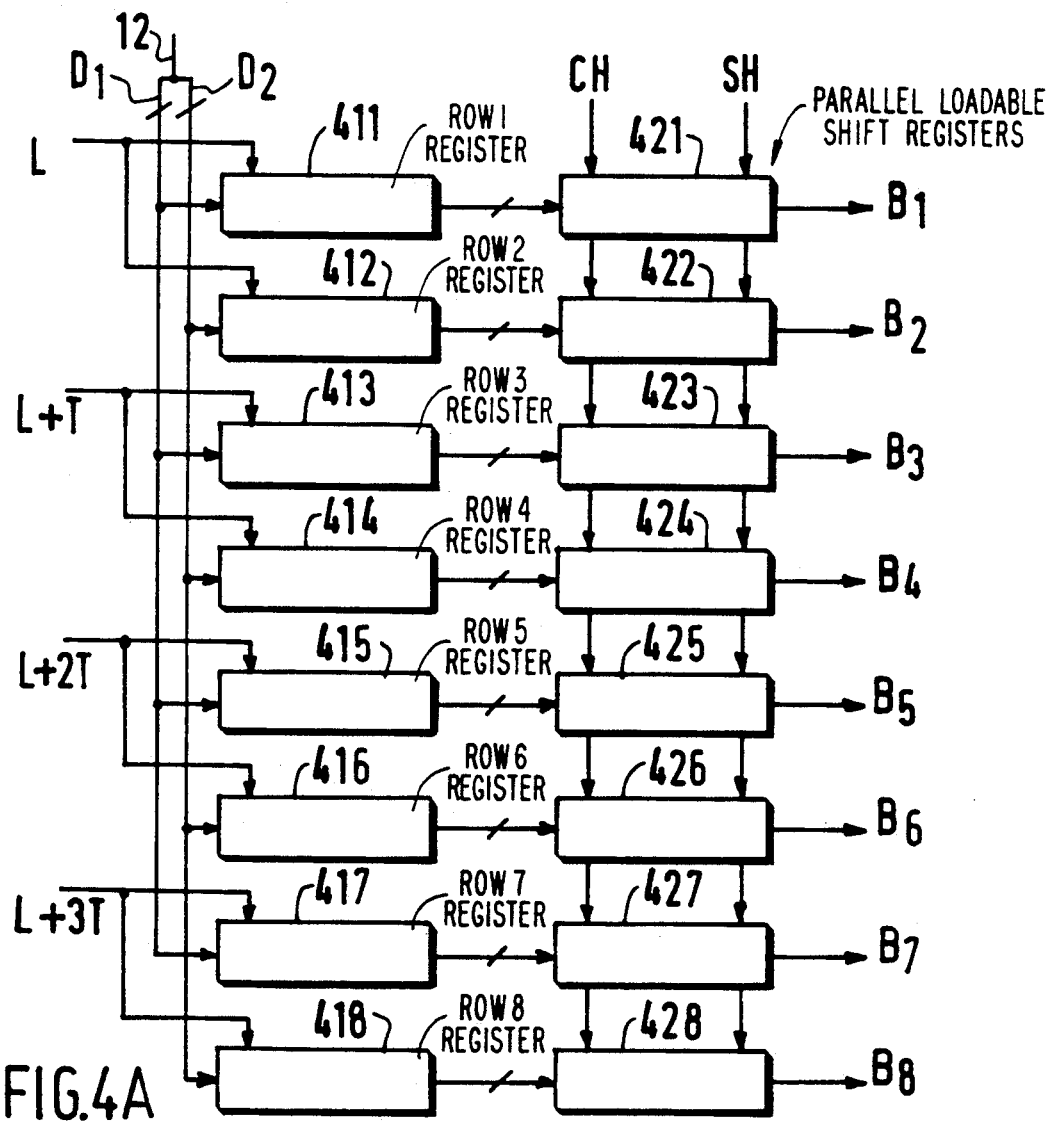
FIG. 4A shows a diagram of a circuit for converting parallel data into serial data.

The diagram shown in FIG. 4A enables the data bits of a data value to be entered in the parallel mode by means of a reduced number of contact pads and to process the data in the serial mode by means of 1-bit operators. Therein, the data bus 12 carries 4 bits of each of 2 data values, which can be read simultaneously:

first data: $d_{11}^1$ to $d_{11}^4$ (input $D_1$)

second data: $d_{21}^1$ to $d_{21}^4$ (input $D_2$).

These data are loaded in parallel in the registers 411 and 412, respectively, under the control of the same command L. In response to the next clock commands L+T, the bits of two other data values are entered:

third data: $d_{31}^1$ to $d_{31}^4$ (input $D_1$)

fourth data: $d_{41}^1$ to $d_{41}^4$ (input $D_2$)

They are loaded in parallel into registers 413 and 414.

The same is performed for the other 4 data values within a column of image elements in response to the commands L+2T and L+3T. Thus, after four commands, the eight 4-bit data values of image elements within the column have been loaded into the registers 411 to 418. They are then loaded together in the registers 421 to 428, respectively, by the common command CH. These registers are loaded in parallel and are serially read by means of the common shift command SH. Thus, using 8 contact pads the data are entered in parallel but nevertheless utilised in the serial mode in order to be used by the subsequent 1-bit operators. The bits of equal weight are thus successively present on the outputs $B_1$ to $B_8$ for the 8 image elements.

The data bits as they appear on the contact pads are represented in table 2 for the parallel mode.

TABLE 2

| Pads | $T_1$ | $T_2$ | $T_3$ | $T_4$ | $T_5$ | $T_6$ |
|---|---|---|---|---|---|---|
| 1 | $d_{11}^1$ | $d_{31}^1$ | $d_{51}^1$ | $d_{71}^1$ | $d_{12}^1$ | $d_{32}^1$ |
| 2 | $d_{11}^2$ | $d_{31}^2$ | $d_{51}^2$ | $d_{71}^2$ | $d_{12}^2$ | $d_{32}^2$ |
| 3 | $d_{11}^3$ | $d_{31}^3$ | $d_{51}^3$ | $d_{71}^3$ | $d_{12}^3$ | $d_{32}^3$ |
| 4 | $d_{11}^4$ | $d_{31}^4$ | $d_{51}^4$ | $d_{71}^4$ | $d_{12}^4$ | $d_{32}^4$ |
| 5 | $d_{21}^1$ | $d_{41}^1$ | $d_{61}^1$ | $d_{81}^1$ | $d_{22}^1$ | $d_{42}^1$ |
| 6 | $d_{21}^2$ | $d_{41}^2$ | $d_{61}^2$ | $d_{81}^2$ | $d_{22}^2$ | $d_{42}^2$ |
| 7 | $d_{21}^3$ | $d_{41}^3$ | $d_{61}^3$ | $d_{81}^3$ | $d_{22}^3$ | $d_{42}^3$ |
| 8 | $d_{21}^4$ | $d_{41}^4$ | $d_{61}^4$ | $d_{81}^4$ | $d_{22}^4$ | $d_{42}^4$ |

It appears, for example that the data bits of the data value $d_{11}$ are applied to the contact pads 1, 2, 3 and 4 and that at the same time the data bits of the data value $d_{21}$ are applied to the contact pads 5, 6, 7 and 8.

Figure 4B:
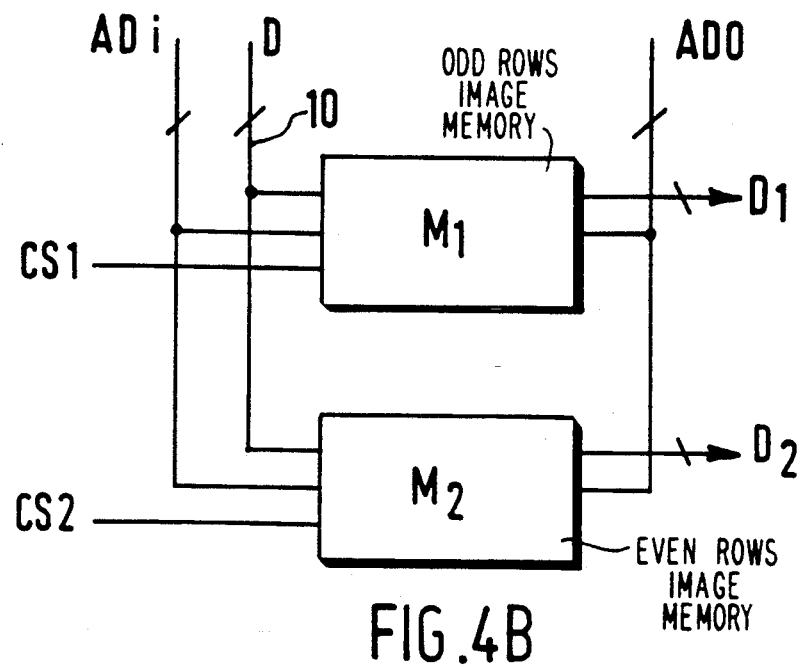
FIGS. 4B and 4C show two feasible organisation diagrams for the image memory.
Figure 4C:
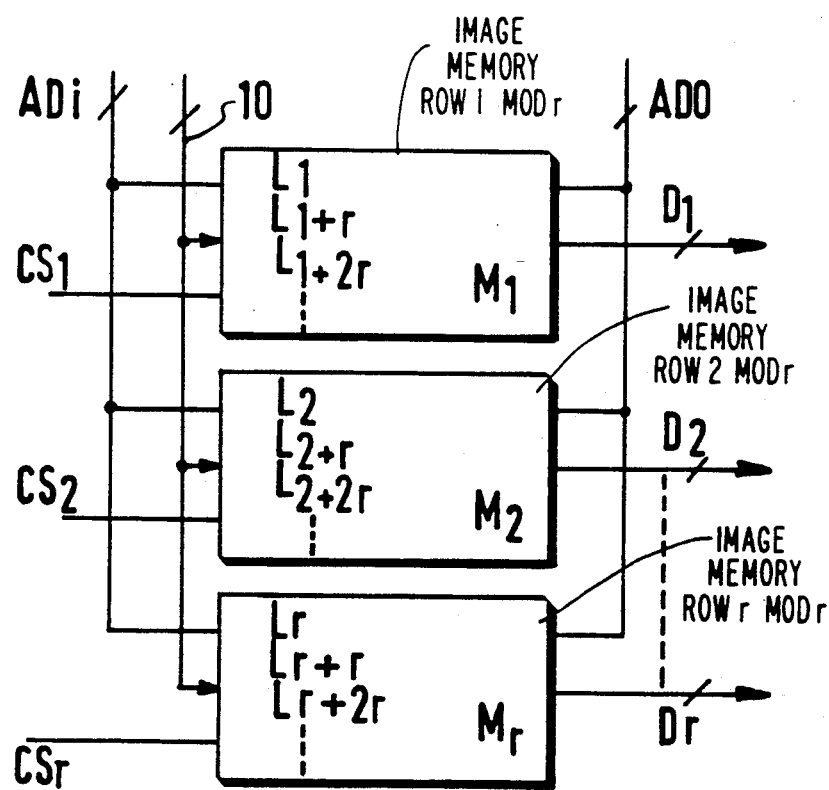

FIGS. 4B and 4C show an example of the organisation diagram of the image memory for the simultaneous reading of the data bits on contact pads 1-4, referred to as $D_1$ and the data bits on contact pads 5-8, referred to as $D_2$. $D_1$ and $D_2$ are collectively referred to as data D. The image memory 11 of FIG. 1 is subdivided into two memories $M_1$ and $M_2$ (FIG. 4B), one of which receives the even rows while the other receives the odd rows. Data D arrives on the bus 10. Two selection signals CS1 and CS2 enable selection of $M_1$ and $M_2$ respectively. They use the same input address bus ADi and the same output address bus ADO. These two buses may carry different instantaneous streams, but the overall streams for a complete frame are equal in order to enable real-time operation. The data bits comprising $D_1$ and $D_2$ are thus separated in order to enable reading for entering the diagram of FIG. 4A. This situation corresponds to the case wherein $N+M-1$ is smaller than or equal to 2M (FIG. 4B).

In the general case involving the parallel input of data, the number Q of contact pads will be the first multiple of the number of bits M in a data value which is larger than $N+M-1$, that is to say when $M+N-1$ is smaller than or equal to r.M, where r is a positive integer. On the other hand, when the data are serially input, $Q=N+M-1$. Consequently, situations arise in which the number Q will be the same in the serial case as well as in the parallel case. These situations are denoted by an asterisk in the table 3 which shows some examples of simple cases.

TABLE 3

| N | M = 4 Q | M = 8 Q |
|---|---|---|
| 2 | 8 | 16 |
| 3 | 8 | 16 |
| 4 | 8 | 16 |
| 5 | 8* | 16 |
| 6 | 12 | 16 |
| 7 | 12 | 16 |
| 8 | 12 | 16 |
| 9 | 12* | 16* |
| 10 | 16 | 24 |
| 11 | 16 | 24 |
| 12 | 16 | 24 |
| 13 | 16* | 24 |

For dealing with the general case where Q is smaller than or equal to r.M, the organisation of the memory may be as shown in the diagram of FIG. 4C in order to form an image processing device in conjunction with the integrated processing circuit. The image memory is then organised in r memory blocks $M_1, M_2, \ldots M_r$. The operation resembles that described with reference to FIG. 4B, but instead of obtaining (for example) the data values of the odd rows only in $D_1$, there are obtained the data values from rows counted modular. Thus it is necessary to adapt the diagram of FIG. 4A for the loading and reading of r registers instead of 2. Thus, the invention also relates to an image processing device which comprises r image memories (where Q=r.M) which supply the input data. The above describes series and parallel processing modes wherein S=M and D=1. In the generalized case wherein those equalities do not necessarily hold, the number of new informations per column is therefore equal to $N+(S-1)d$.

Inside the integrated circuit the data entered in the serial mode or the parallel mode are used by serial operators which perform an operation in accordance with an image processing procedure where an image element calculated is a function of an environment (defined by the window) of an image element of the source image.

The data stream at the input of the image memory cannot be compressed. Consequently, the data stream at the input of the circuit is identical for a long period of time, for example one frame. For shorter periods, for example for one row of the image memory, this stream must be as near as possible to the input stream in the image memory in order to avoid the necessity of complex memory organisations.

Figure 6:
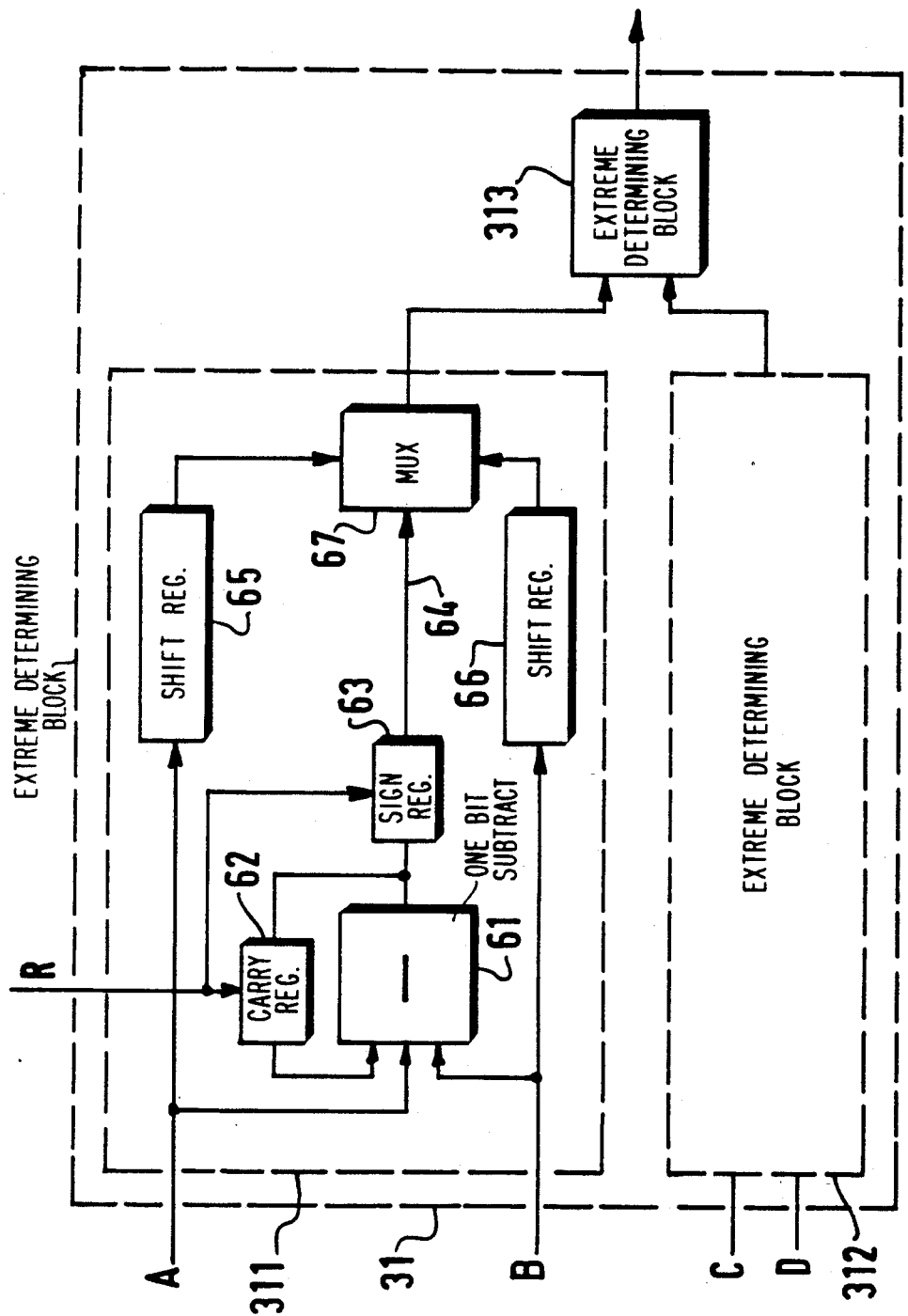
FIG. 6 shows a diagram of a second embodiment for performing sorting operations.

FIGS. 5 and 6 show two different types of processing by way of example.

FIG. 5 shows a processing example in the case where the function chosen is the convolution:

$$g_{i,j} = \text{sum of } a_{n,p} \cdot d_{i+n, j+p}$$

For a window 5.5, the window convolution module 31 is composed of N=5 row convolution units 51, 52, 53, 54, 55 which are connected to the inputs 510, 520, 530, 540 and 550, respectively. The five units have the same construction. Their outputs are connected to the adder tree 56 which supplied the result of the convolution module 31. Each unit, for example the unit 51, comprises $p-1=4$ shift registers 511, 512, 513, 514 which delay the data by 4 clock beats (M=4 bits) so that the serial data can be presented for multiplication on the input of P=5 serial pipeline multipliers 515, 516, 517, 518 and 519. Each multiplier calculates the product of a coefficient $a_{np}$ and the data present on its input. Such a serial multiplier is described, for example in "On a bit-serial input and bit-serial output multiplier" by R. Gnanasekaran, IEEE Transactions on Computers, Vol. C32, No. 9, Sep. 1983. The output results of the multipliers are added in an serial adder tree 71. All units 51, 52, 53, 54 and 55 receive their own data and their own coefficients. The results on the outputs of these units are added in the adder tree 56. For the complete processing over 4 windows it is necessary to realise 4 convolution modules such as module 31 which share a given number of resources:

the memory for the coefficients $a_{np}$ is a common memory the shift registers which process the rows common to several windows may be common in order to reduce the surface area of the integrated circuit.

The serial operators thus perform a convolution between the digitised signals of the local image elements and a matrix of N.P coefficients stored in a memory.

FIG. 6 relates to a second example for which the processing consists of searching, for example for an extreme value, namely the minimum or the maximum of the values in the current window, so that $$g_{i,j} = \text{Min/Max} \ (d_{i+n, j+p})$$

where n is situated between $-N/2$ and $N/2$ and p is situated between $-P/2$ and $P/2$.

In the present example, the window comprises 4 rows and 4 columns. The data values are entered bit-serially, starting with the least significant bits of the inputs A, B, C and D. For the pair A, B extreme determining (block 311) a 1-bit subtractor 61 which is coupled to a carry storage register 62 enables calculation of the sign of the difference between the data applied to A and B in four clock beats ($M=4$ bits). This register 62 is reset to zero by a signal R at the instant at which the least significant bit is present at A and B. The signal R at the same time triggers the introduction of the sign bit into the register 63 in which it is stored. Two shift registers 65, 66 which each have a length of $M=4$ bits, delay the data A and B, respectively. The output 64 of the register 63 controls a multiplexer 67, enabling selection of the minimum or the maximum value of the two values, depending on the value of the sign. Using two multiplexers, the minimum and the maximum can be simultaneously output. The two other inputs C and D are coupled to an extreme determining block 312 which is similar to block 311. The two output signals thereof are applied to an extreme determining block 313 which performs the same operation as the blocks 311 and 312 and which supplies the result of the operation performed on the four data A, B, C, D. In order to perform the searching operation on a whole window, it suffices to repeat the diagram of the module 31 once and to supply it with the four intermediate results obtained for 4 consecutive columns by the module 31, subject to the condition that 3 of these 4 results must be stored in advance in 3 registers. The processing over several windows takes place in accordance with the diagram of FIG. 3. Thus, the serial operators perform a searching operation among the elements of the defined local images.

The serial convolution module and the serial searching circuit described above represent examples of the application of the invention and to those skilled in the art many alternatives will be evident without departing from the scope of the invention.

We claim:

1. A device for performing an image processing procedure on digital image element signals which are representative of a source image defined by image elements arranged in rows and columns, each element signal being encoded into M bits, said circuit comprising:
   an integrated processing circuit having only Q contact pads for receiving the digital image element signals;
   means external of said integrated processing circuit for step-wise fetching element signals from image elements lying in Q rows of the source image and applying said fetched image element signals to said contact pads respectively as bit-serial streams of element signals;
   said integrated processing circuit comprising means for processing said bit-serial streams in accordance with said image processing procedure by bit-serial operators operating in parallel;
   each bit-serial operator serially acting on the M bits of the element signals of the Q rows of the source image to form a result signal by processing S local images;
   said S local images being defined by S rectangular windows on said source image;
   each window consisting of P columns and N rows, wherein $N>1$, said windows are maintained shifted d rows with respect to each other, wherein $0<d<N$ and $Q=N+(S-1)d$, and step-wise slid together in successive positions along the Q rows of the source image for each of said S windows in each successive position; and wherein the number of local images S is equal to the number of bits M.

2. A device for performing an image processing procedure on digital image element signals which are representative of a source image defined by image elements arranged in rows and columns, each element signal being encoded into M bits, said circuit comprising:
   only Q contact pads for receiving the digital image element signals;
   means for step-wise fetching element signals from image elements lying in $N+(S-1)d$ rows of said source image, wherein $0<d<N$, $N>1$ and Q is greater than or equal to $N+(S-1)d$, and applying M bits of r of said element signals at a time to said contact pads, where $r>1$ and $Q=rM$,
   said fetched element signals being from S local images, respectively defined by S rectangular windows onto said source image, each window consisting of P columns and N rows, which windows are maintained shifted d rows with respect to each other and step-wise slid together in successive positions along said $N+(S-1)d$ rows of the source image;
   parallel to serial converter means for converting the image element signals applied to said contact pads to $N+(S-1)d$ bit-serial streams of element signals from image elements lying in respective rows;
   means for processing said bit-serial streams in accordance with said image processing procedure by bit-serial operators operating in parallel;
   each bit-serial operator serially acting on the M bits of the element signals of the $N+(S-1)d$ rows to form a result signal for each of said S windows in each successive position; and wherein the number of local images S is equal to the number of bits M.

* * * * *